Figure 1:
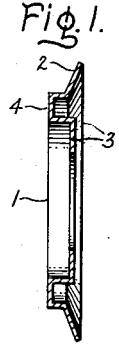

Oct. 20, 1953     R. DUVAL     2,656,494

BLOCKING-LAYER RECTIFIER

Filed June 20, 1951

Inventor:
Raymond Duval,
by   *Claude H. Mott.*
His Attorney.

Patented Oct. 20, 1953

2,656,494

UNITED STATES PATENT OFFICE 2,656,494

BLOCKING-LAYER RECTIFIER

Raymond Duval, Versailles, France, assignor to General Electric Company, a corporation of New York Application June 20, 1951, Serial No. 232,496
In France November 14, 1950

4 Claims. (Cl. 317—234)

1

My invention relates to alternating current rectifiers of blocking-layer type, for example, copper oxide or selenium rectifiers, and more particularly to structures for mounting and interconnecting the individual rectifying elements or plates in such rectifiers.

As is well known in the art, the rectifying elements of blocking-layer type rectifiers commonly consist of metal base plates which are provided on one or both principal surfaces with a layer or coating of semi-conducting compound, this compound being in turn coated with a contact metal called a counter-electrode. The resistances of such an element to voltages of opposite polarities applied between the counter-electrode and the base are very significantly different. Thus when an alternating voltage is applied to such an element, it passes current freely in one direction, i. e., for one-half cycle of the alternating voltage wave, but practically prevents current flow in the other direction, i. e., for the other half cycle of the voltage wave. This action results from the formation of a "blocking layer" at one surface of the semi-conducting layer.

In a rectifier of any considerable power capacity, a number of these separate rectifying elements must be connected in series or parallel circuit relation, and means must be provided for supporting and interconnecting them. Ordinarily the rectifying elements or plates are each provided with a central hole and are stacked on an insulated shaft or assembly bolt passing through the holes, insulating spacers being placed between the various plates to prevent them from contacting each other. The stack formed by the plates is then clamped by means of nuts screwed on the assembly bolt. In order to reduce any pressure variations caused by the thermal expansion or contraction of the bolt, spring washers or other resilient means are usually employed with the clamping nuts.

In well-known stacking arrangements the two sides of each plate are connected in parallel, and heretofore the parallel connection has been accomplished by means of a conducting bushing arrangement which electrically connects contact members engaging opposite sides of each plate. Connecting asemblies of this sort, although electrically satisfactory, are in many cases rather complex mechanically since they require a number both of conducting and insulating parts. This multiplicity of parts not only makes the connecting assemblies themselves quite costly but also makes the assembling of any rectifier

2 structure including them a complicated and expensive process.

It is a general object of my invention, therefore, to provide a new and improved structure for mounting and interconnecting the various rectifying elements of a blocking-layer type rectifier.

It is a more particular object of my invention to provide new and improved contact means for connecting together the two sides of blocking-layer type rectifying elements assembled in stacked relation.

In carrying out my invention in one form I provide a plurality of two-sided rectifier plates stacked in flatwise relation upon an insulated bolt with insulating spacers or collars therebetween. Upon opposite sides of each plate and between the insulating spacers I provide a pair of spring contact washers or cups of identical formation, the outer peripheries of which engage opposite sides of the plates and the inner peripheries of which are in mutual contacting engagement. The washers are formed with annular recesses lying between annular inner and outer contact rims or shoulders, and are oppositely disposed with the inner shoulders engaging each other and with the annular recesses forming together an annular cavity within which is disposed an insulating ring. The rectifier plate, having a central hole, is mounted on this insulating ring, and opposite sides of the plate are engaged by the two outer annular cup shoulders.

Figure 2:
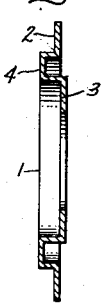
Figure 3:
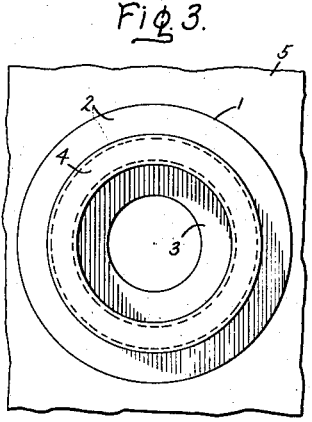
Figure 4:
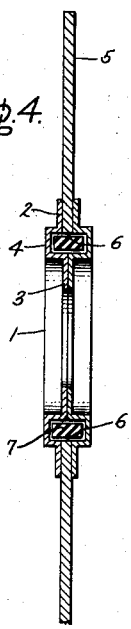
Figure 5:
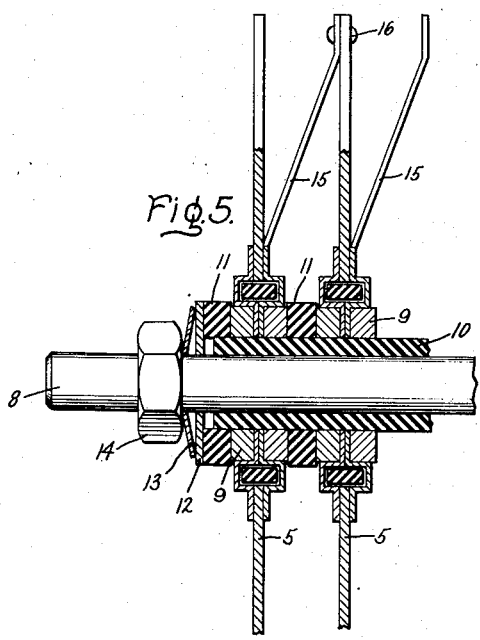
Figure 6:
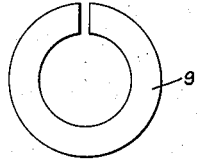

The features of this invention which are believed to be novel and patentable are set forth with particularity in the appended claims. The invention itself, however, both as to organization and mode of operation, together with additional objects and advantages thereof may be best understood by reference to the following description to be taken in conjunction with the accompanying drawing in which:

Fig. 1 is an axial section of one form of the contact cups or washers; Fig. 2 is another axial section of the contact washer of Fig. 1 showing the deformation produced therein when the washer is clamped against a rectifying element; Fig. 3 is an end elevation of the contact washer; Fig. 4 is an axial section showing a pair of the contact washers connecting together the two sides of a rectifying element; Fig. 5 is an axial section showing a rectifier element mounting and interconnecting structure embodying this invention; and Fig. 6 is an end view of a spacer included in the structure of Fig. 5.

Referring to Figs. 1 and 3, therein is shown one form of the contact cups or washers employed in this invention, the illustrated washer 1 consisting of an elastic annular outer rim or shoulder 2 frusto-conically shaped, an annular inner rim or shoulder 3 having an end portion in the form of an inwardly turned lip, and a center ridge portion 4 which joins together the two shoulders so that, in effect, the shoulders and the center portion form the walls of, i. e., define, an annular recess. Although in the illustrated form of washer 1, rims 2 and 3, and center portion 4 are all of a circular shape, it is, as will become more increasingly obvious, not necessary that they be so shaped, but in alternate forms of the washer they may be of various other ring-like shapes, such as, for example, hollow ovals, squares or rectangles. The word "annular" is therefore intended hereinafter to cover not only true ring shapes but also all other shapes as form an endless path around a center point. Whatever their shape, washers 1 may be formed of various conducting materials, but preferably are formed of a conducting metal such as copper. As illustrated in Fig. 4, a pair of such washers 1 are used to connect in parallel the two sides of a rectifying element or plate 5, the element being provided with a central hole 6 to accommodate inner shoulders 3. Element 5 may be any of the blocking-layer type rectifying elements well known to the art, such as, for example, selenium or copper oxide rectifying elements.

To connect together the opposite sides of rectifying element 5, washers 1 are placed on each side of the element so that the outer peripheries of outer shoulders 2 engage the sides of the element and inner shoulders 3 extend into mutual contacting engagement within the hole 6. Then pressure is applied by some clamping means to inner shoulders 3 so as to force them together. The engagement of the inner shoulders, of course, completes the parallel connection between the sides of the element, the end portions of shoulders 3 in the illustrated washers being turned inwardly, as previously mentioned, in order to increase the contact area between the washers. In order to prevent any radial movement of element 5 and thus any accidental contact between washers 1 and the base metal plate of element 5, an insulating ring 7 is placed, as shown, in the annular cavity formed by the recesses of washers 1, the ring 7 obviously being placed between the washers before the clamping pressure is applied. In other words, in the assembly process first element 5 is mounted on insulating ring 7, then washers 1 are placed on both sides of the element and the insulating ring, and finally the clamping pressure is applied.

If the washers of the illustrated form are used, the frusto-conically shaped outer shoulders 2 flatten out to take on the shape shown in Figs. 2 and 4, as inner shoulders 3 move together, the flattening process being completed at the same time as shoulders 3 come into firm engagement in hole 6. By proper selection of the dimensions of washers 1, the end portions are flattened by a pressure sufficient to ensure good contact with the sides of the plate without damaging the blocking-layer. Both with the illustrated form of washers 1 and with various other forms thereof, the clamping pressure may be increased a great deal once inner shoulders 3 have engaged, without appreciably increasing the pressure of outer shoulders 2 on the faces of element 5.

For example, with the illustrated washers, the clamping pressure may be increased to several hundreds of kilograms, it being limited in a multi-element rectifier only by the compressive strength of the spacers or insulators separating the plates of the rectifier. This results in a rectifier structure in which the contact between the faces of the rectifier elements and the contact members is not affected by variations in pressure transmitted by the clamping means whenever that pressure is higher than the pressure necessary to cause flattening of the outer rim portions. The steady contact pressure obtained thereby protects the rectifier element against the premature aging due to variations in contact pressure such as occurs in many conventional rectifiers. Thus the new and improved connecting means of this invention in addition to being less complex and less expensive than the means heretofore available also provide a very desirable type of contact pressure.

In Fig. 5 there is illustrated a multi-element rectifier in which a plurality of rectifying elements 5 are mounted in a supporting and interconnecting structure embodying this invention. The mounting member of the structure comprises an assembly shaft or bolt 8 around which are disposed in flatwise relationship the various rectifying elements 5 and their positioning and clamping means. Each of elements 5 is held between a pair of contact washers 1, and each pair of contact washers in turn is held between a pair of electrically conducting spacing rings 9. Both washers 1 and spacers 9 are spaced from bolt 8 by an insulating sleeve 10 that surrounds the bolt, and in order to electrically isolate each element 5, insulating rings 11 are placed between the spacers 9 associated with the different elements 5. A ring 11 is also positioned between the spacer 9 nearest the end of the shaft and the clamping means which comprises end plate 12, spring washer 13 and nut 14. Spacers 9 are thus confined at their outer edges by shoulders 3, at their inner edges by tube 10 and at their sides by rings 11 or by the inwardly turned lips of shoulders 3. Being confined on all sides the spacers thereby need have little structural strength and this permits the use of inexpensive spacers as may be obtained easily by winding a wire of rectangular cross section on a drum of suitable diameter and then making a single cut in each turn of wire, the process producing spacers of the type shown in Fig. 6. Of course, spacers of other types may be used, especially those cut from a plate of metal. Moreover, if so desired, spacers 9 and rings 11 could be combined into a single spacing and insulating member.

The clamping pressure necessary to keep washers 1 in firm contact with elements 5 and to give rigidity to the entire rectifier structure is supplied at each end of bolt 8 (one end only shown in Fig. 5) by the nut 14 which is threaded thereon, the pressure from nut 14 being transmitted by spring washer 13 and end plate 12 to rings 11 and the rest of the members disposed around bolt 8. As previously mentioned, however, once inner shoulders 3 of the illustrated embodiment have engaged as shown in Fig. 5, additional pressure from nuts 14 is not transmitted to outer shoulders 2 but rather is absorbed in insulating rings 11, spacers 9 and the inner shoulders themselves. Thus if contact washers of the correct dimensions are employed, the blocking layers of elements 5 cannot be damaged by the overtightening of nuts 14.

In order to interconnect the various rectifying elements 5, a conducting strip 15 is attached by welding or other suitable means to a point on the outer edge of alternate ones of contacts members 1. The other end of strip 15 is attached by a rivet 16 to the adjoining element 5 in an area where the outer metal layer and the blocking layer are removed. This connection places the adjoining rectifying elements in series and allows rectification of higher voltages than can be handled by one rectifying element alone. Strips 15, of course, also provide the means for connecting the various rectifying elements into a polyphase circuit.

In accordance with the patent statutes, I have illustrated and described my invention with reference to a particular embodiment thereof, but it will be obvious to those skilled in the art that numerous changes and modifications may be made therein without actually departing from the invention. Therefore, I aim in the appended claims to cover all such equivalent variations as come within the true spirit and scope of the appended claims.

What I claim as new and desire to secure by Letters Patent of the United States is:

1. In a blocking-layer type rectifier, a rectifying element provided with a hole, a pair of spring contact washers each having annular inner and outer shoulders and an intermediate annular recessed portion joining said shoulders, said washers being disposed on opposite sides of said element with said outer shoulders each engaging the adjacent of said oposite sides and with said inner shoulders extending into said hole and engaging each other whereby said oposite sides are electrically connected.

2. In a blocking-layer type rectifier, a rectifying element provided with a hole, an insulating ring disposed within said hole and mounting said element, and a pair of similar sprng contact washers each having annular inner and outer rims and an intermediate annular recessed portion joining said rims, said washers being disposed on opposite sides of said element with said outer rims each engaging the adjacent of said sides and said recesses forming a cavity enclosing said insulating ring with said inner rims engaging in said hole whereby said opposite sides of said element are electrically connected.

3. In a blocking-layer type rectifier, a rectifying element provided with a hole, an insulating bushing disposed within said hole and contacting the edge of said hole, and a pair of similar contact washers each having an annular outer shoulder provided with frusto-conically shaped end portions and an inner shoulder provided with an inwardly extending lip and a recessed annular center portion joining said shoulders, said washers beig disposed on opposite sides of said element with said outer shoulders each engaging the adjacent of said opposite sides and said center portions defining a cavity enclosing said insulating ring, said inner shoulders engaging in said hole whereby said opposite sides of said element are electrically connected.

4. A rectifier comprising a plurality of rectifying elements each provided with a hole, a separate insulating brushing disposed within the hole of each of said elements to mount said element, a pair of similar annular contact cups for each of said elements, each of said cups having an annular outer rim and an annular inner rim and an annular center portion joining said rims, said rims and said center portion of each of said cups defining an annular recess, the separate cups of each of said pairs of cups being disposed on opposite sides of the associated of said elements with their said outer rims each engaging the adjacent of said sides and said recesses cooperating to form a cavity enclosing the associated of said insulating bushings and with their inner rims engaging in said hole to connect said opposite sides of the associated element in parallel, insulating rings disposed between the cups associated with different of said elements to electrically isolate each of said elements, and an insulated shaft passing through said cups and said insulating rings to mount said cups and rings whereby said elements are held in stacked flatwise relation to each other.

RAYMOND DUVAL.

References Cited in the file of this patent

UNITED STATES PATENTS

| Number | Name | Date |
|---|---|---|
| 1,718,663 | Ogden | June 25, 1929 |
| 2,114,898 | Dormoy | Apr. 19, 1938 |
| 2,388,532 | DeLange et al. | Nov. 6, 1945 |
| 2,509,342 | Hedding et al. | May 30, 1950 |